(No Model.)

F. REULEAUX.
APPARATUS FOR STARTING, STOPPING, AND REVERSING ROTARY MOTION.

No. 271,987. Patented Feb. 6, 1883.

Witnesses,
J. A. Rutherford
George W. Rea

Inventor,
Franz Reuleaux,
By James L. Norris.
Atty.

UNITED STATES PATENT OFFICE.

FRANZ REULEAUX, OF BERLIN, GERMANY.

APPARATUS FOR STARTING, STOPPING, AND REVERSING ROTARY MOTION.

SPECIFICATION forming part of Letters Patent No. 271,987, dated February 6, 1883.

Application filed November 9, 1882. (No model.) Patented in England October 5, 1882, No. 4,746.

*To all whom it may concern:*

Be it known that I, FRANZ REULEAUX, a citizen of Prussia, residing at Berlin, in the Empire of Germany, have invented Improvements in Apparatus for Starting, Stopping, and Reversing Rotary Motion, (for which I have obtained provisional protection in Great Britain, No. 4,746, and dated October 5, 1882,) of which the following is a specification.

This invention relates to improved apparatus whereby the rotary motion of a shaft, whether employed for winding apparatus, for raising and lowering objects, or for imparting rotary or rectilinear motion to machinery, can be started, stopped, or reversed at will.

The invention consists mainly in combining with the shaft to be driven a continuously-revolving driving wheel or pulley loose thereon, a clutch sliding upon but carried round by the shaft, and screw-gear or equivalent device carried by the shaft for putting the clutch in or out of gear with the wheel or pulley, the parts being so arranged that by turning the screw-gear in one direction the shaft is made to revolve in one direction, while by turning it in the contrary direction the motion of the shaft is reversed, and by stopping the motion of the screw-gear the motion of the shaft is also stopped.

Figure 1:
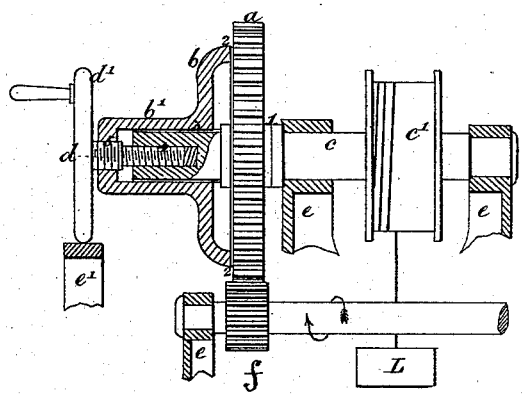
Figure 2:
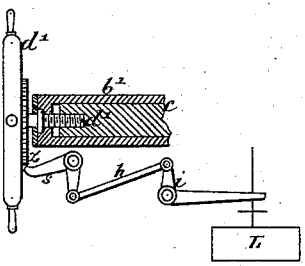

In the accompanying drawings, Figure 1 is a side elevation, partly in section, of an apparatus embodying my invention; and Fig. 2, a partial sectional view, showing a modification which will be hereinafter explained.

The toothed wheel $a$, which is continuously rotated in one and the same direction, either by gearing, as at $f$, or by hand or any other convenient power, runs loose upon the shaft $c$, bearing against a fixed collar at 1 thereon. The clutch-disk $b$ slides with its boss $b'$ longitudinally on the shaft $c$ at the point 3, but is caused to revolve therewith by a feather and groove, or by other means, and it is capable of being geared with the wheel $a$ by frictional contact at 2, its movement to and from $a$ for this purpose being effected by means of the screw-gear $d$, screwing with differential threads through the boss $b'$ of $b$ at 5 and into the end of the shaft $c$ at 4. On the shaft $c$ is fixed a winding-drum, $c'$, by means of which a load, L, can be raised or lowered. The wheel $a$ being rotated continuously in one and the same direction—namely, in that direction which corresponds to the raising of the load L—such raising of L will take place so soon as the clutch $b$ is in gear. The screw-gear $d$ is in this case shown as a differential screw, as before stated, with small difference of pitch, the two threads being in such a direction that the hand-wheel $d'$, fixed thereon, has to be turned in the same direction as $a$ when the clutch is to be put in gear. In order to secure the position of the wheel $d'$ after the clutch has been disengaged, $d'$ being then at rest, a brake is usually applied to the wheel $d'$, as indicated at $e'$. This is connected with the framing $e$, and prevents the rotation of $d'$ by moderate friction at 2. The mechanism thus arranged is suited for accomplishing the above-mentioned objects.

If the load is to be raised, the stopping-wheel $d'$ is rotated in the same direction as $a$, so that the clutch $b$ is pressed against $a$ with sufficient force to cause the coupling and shaft to be carried round by $a$, by reason of the frictional contact at 2, and the hauling-rope is wound up on the drum $c'$. If the load is to be stopped, the wheel $d'$ only has to be prevented from rotating. In consequence hereof the parts $c$ and $b$, which are still in motion, screw back on the screw-threads 4 5 the parts of the female screw-threads 4 and 5 contained therein, during which time the wheel $d'$ slides backward on the brake at $e'$ in an axial direction. By this means the pressure at 2 will be diminished, but only exactly to such an extent that there shall be sufficient friction left to prevent the load from causing the shaft $c$ to revolve in the contrary direction. The frictional surfaces at 2 therefore now act as a brake for keeping the load suspended, the degree of pressure required for this purpose being automatically determined, whether the load be great or small, because if this should begin to sink it puts $b$ and $c$, and consequently also the female screws 4 and 5, in motion, causing the clutch to advance, so that the pressure at 2 will be increased. If, on the other hand, it begins to rise, owing to the shaft being carried round by $a$, the female screws 4 and 5 will screw themselves backward on the screw-threads 4 and 5, thereby decreasing the frictional pressure at 2. The brake at $e'$ prevents the wheel $d'$ from being carried round by the frictional contact of the male and female screw-threads. If the frictional surfaces at 2 are well oiled, the automatic regulation takes place so accurately that the load remains quite stationary. With imperfect lubrication slight oscillations about the position of rest will take place.

If it be desired to let the load descend, the stopping-wheel $d'$ must be turned in the direction of the backward motion of the shaft $c$. The shaft then runs backward in general at just the same speed as the wheel $d'$ is rotated, for as soon as by the backward motion of $d'$ the friction at 2 is somewhat reduced the shaft $c$, with clutch-disk $b$, actuated by the load L, will be caused to move backward; but by this motion, if $d'$ were to be stopped, the female screws 4 5 would be screwed forward on their male screws exactly to the same extent as that to which the screws were released by means of the backward motion of wheel $d'$. The interrupted condition of the equilibrium between the momentum of the friction at 2 and that of the load will therefore be continually reinstated—that is to say, if the backward rotation of the wheel $d'$ be interrupted, the descent of the load will cease. It will be seen that if the wheel $d'$ be moved gradually from a state of rest—that is, with a less angular velocity than $a$—a gradual commencement of motion will take place under sliding contact of the surfaces at 2, and in the same manner a gradual stopping of the load toward the end of the motion may be effected by means of the gradual motion of the wheel $d'$.

It will be evident that the shaft $c$ may be made simultaneously to raise one load—such as a filled bucket—and to lower a second load—such as an empty bucket—the apparatus being in that case operated by the difference between the two loads.

The frictional clutch, with flat frictional surfaces, (shown at Fig. 1,) is only shown by way of example. In place thereof may be used in some cases a conical friction-clutch, a cylindrical clutch, a belt-coupling, or any other frictional device, the arrangement being in every case such that the part $b$, if moved in one direction or the other, causes the gearing or throwing out of gear of the clutch. If the power required for gearing the clutch be small, I employ in place of the differential screw a simple screw, as shown at Fig. 2, which is connected in a rotatable manner to one of the parts $d'$ or $b'$, as here shown at 5, while the screw-thread works in the other part. If necessary, the female thread and male thread may be reversed, so that the former is connected to $d'$ and the latter to $a$ or $b$.

It will be evident that in place of screw-threads cam surfaces or grooves might be used for effecting the motion of the clutch; also, that in place of a toothed wheel, $a$, a pulley driven by a belt or chain may be used.

The brake $e'$ of the wheel $d'$ may be applied at any other point than the circumference of the wheel, and the brake-pressure may be applied by means of a weight, a blade-spring, or by other suitable means. In certain cases I apply a safety-catch for the screw-gear, as shown at $s\ h\ i$, Fig. 2, which brings it to rest, so as to stop the motion as soon as the load L has been raised beyond a certain point.

In cases where considerable power is required for actuating the screw-gear $d\ d'$ for starting, stopping, and reversing the apparatus, such screw-gear may itself be operated by a small auxiliary starting, stopping, and reversing apparatus of similar construction to that above described. In this case the brake $e'$ would generally be applied only to the wheel $d'$ of the auxiliary apparatus. Where only small power is required for actuating the screw-gear the wheel $d'$ may be turned either by hand or by any suitable automatic tripping-gear.

Although I have shown the apparatus as applied to the raising and lowering of a single load by means of a winding-drum, yet it will be evident that it may also be made to simultaneously raise a load—such as a filled bucket—on one drum, and to lower another load—such as an empty bucket—on a second drum, the motion of the wheel $a$ being reversed when the motion of the buckets has to be reversed. It is also applicable not only for raising and lowering a load by other known mechanical devices—such as by a pinion or worm on the shaft $c$ in gear with a rack or worm-wheel that serves to raise the load—but also for effecting the starting, stopping, and reversing of the motion of the machinery, whether rotary or rectilinear, the shaft $c$ being for this purpose geared either to other shafting to be driven, or to a toothed rack or other mechanism, the continued tendency of the shaft $c$ to turn backward being in that case imparted either by a weight, L, acting on a drum or pulley, $C'$, thereon, or by a wheel on the shaft, connected thereto by frictional contact, and rotated continuously in the backward direction by other gearing, the frictional contact being sufficient to cause the shaft to turn backward so soon as it is released from the action of the wheel $a$. I prefer, however, to employ for this last-described purpose a construction of the apparatus which is described in another application for Letters Patent which I have filed, bearing equal date herewith.

Having thus described the nature of my invention and in what manner the same is to be performed, I claim—

1. The combination of a shaft having means to suspend a load therefrom, a wheel or pulley loose on the shaft, devices for continuously revolving the wheel or pulley in the same direction, a clutch revolving with but capable of sliding on the shaft, a screw rotated by the shaft and connected with the clutch, and mechanism for holding the screw against rotation to disengage the clutch from the continuously-revolving wheel or pulley, substantially as described.

2. The combination of the shaft $c$ to be driven, with the continuously-rotating driving-wheel $a$ loose thereon, the clutch device $b$, sliding upon but carried round by the shaft *c*, the screw device *d*, for putting the clutch *b* in and out of gear with the wheel *a*, and the brake *e'*, or equivalent device, for arresting the motion of the screw device, all arranged and operating substantially as herein described.

In testimony whereof I have signed my name to this specification, in the presence of two subscribing witnesses, this 17th day of October, A. D. 1882.

FRANZ REULEAUX.

Witnesses:
B. ROI,
H. ZIMMERMAN.